Feb. 21, 1956  H. B. DENMAN  2,735,813
LINER MATERIAL FOR LEAF SPRING ASSEMBLIES
Filed March 27, 1952
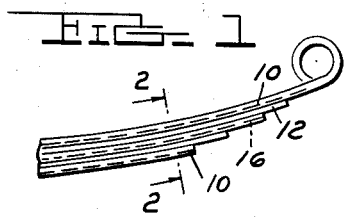
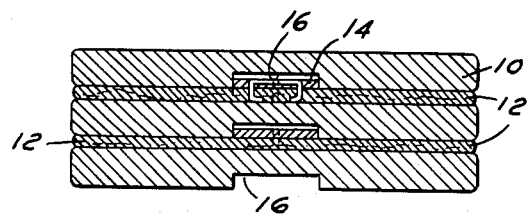
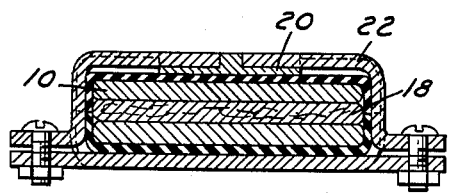
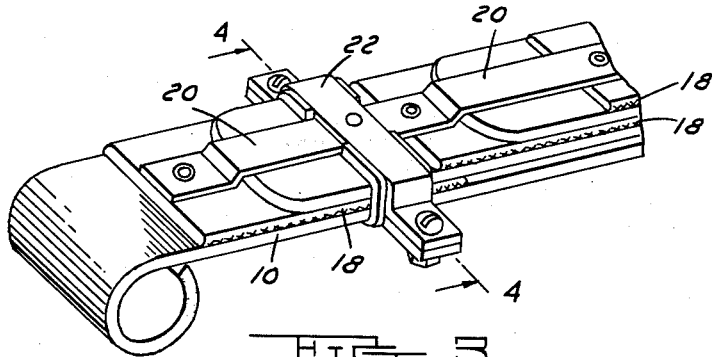
INVENTOR.
HARRY B. DENMAN
BY
Burton & Parker
ATTORNEYS United States Patent Office 2,735,813
Patented Feb. 21, 1956

2,735,813

LINER MATERIAL FOR LEAF SPRING ASSEMBLIES

Harry B. Denman, Detroit, Mich., assignor to Detroit Gasket & Manufacturing Company, Detroit, Mich., a corporation of Michigan Application March 27, 1952, Serial No. 278,869

4 Claims. (Cl. 252—12)

This invention relates to an improved spring liner for leaf spring assemblies and particularly motor vehicle multiple leaf spring assemblies.

Multiple leaf springs are commonly used on automotive vehicles. Such springs comprise a plurality of superimposed leaves fastened together to make up the assembly. It has been the practice for many years to provide friction reducing liners or inserts between the successively superimposed leaves of the spring assembly. These liners may be provided of sufficient length to extend substantially throughout the length of the spring leaves between which they are interposed, or they may be provided in relatively short lengths and disposed between successive leaves adjacent to the ends of the leaves only.

Such liners are intended to serve the purpose of automatically and continuously lubricating the spring leaves during use of the spring and thereby eliminate the necessity of periodically separating the leaves of the spring assembly and placing lubricant therebetween. Such liners must be flexible to conform with the flexing movement of the spring. They are designed to facilitate smooth functioning as well as to reduce the noise resulting from friction between the leaves.

Such liners or inserts are held in place in many different ways. Individual spring leaves may be provided with depressions or cutouts into which protuberances on the liner, such as ridges or the like, may be received whereby the liner is held in place. Such a construction is illustrated in United States patent to Thompson 2,161,838, dated June 13, 1939. A plurality of relatively short liner sections may be carried by means adapted to support them interposed between the ends of the spring leaves. Such construction is shown in application of the assignee of this application, Serial No. 239,977, filed August 2, 1951, now Patent No. 2,660,425.

This invention relates to the construction of the liner or insert itself, whether the same is of a long or short length and regardless of how it is held in place between the leaves of the spring assembly.

An object of the invention is the provision of a spring liner formed of resilient moisture resistant long wearing composition material which material contains an ingredient or ingredients that will migrate to the opposite spring leaf contacting surfaces of the liner, and which ingredients when present on the surface of the liner possess satisfactory lubricating characteristics for the spring leaves.

Another object is to provide such a liner formed of a rubber composition containing ingredients possessing lubricating characteristic which ingredients will "bloom" or migrate to the surfaces of the liner in contact with the spring leaves and lubricate them. The liner is of a character wherein the lubricating ingredients which migrate to the surface of the rubber to lubricate the spring leaves are present within the rubber compound and continue to bloom to the surface thereof throughout a relatively long period of time and therefore serve their lubricating function throughout a long life.

Preferably, the bloom producing ingredients are such as are now used in rubber compounds for other purposes, for example, as activators, softeners or processing aids. Such ingredients therefore are entirely compatible in the compound. I employ them in quantities substantially in excess of those quantities now used and in such quantities that they will bloom to the surface.

Other objects, advantages and meritorious features of this invention will more fully appear from the following description, claims and accompanying drawing wherein:

Fig. 1 is a fragmentary side elevation of a leaf spring assembly with inserts such as are herein described;

Fig. 2 is a cross sectional view taken on the line 2—2 of Fig. 1;

Fig. 3 is a fragmentary perspective of an end portion of a leaf spring assembly embodying the inserts of the character herein described held in place in a manner different than that shown in Figs. 1 and 2;

Fig. 4 is a cross sectional view taken on the line 4—4 of Fig. 3.

The figures of the drawing illustrate two ways in which inserts such as are herein described might be mounted between the leaves of a spring assembly. However, this particular invention is not dependent in any way upon the manner or means wherein the inserts are mounted between the spring leaves or supported within the spring assembly. This invention relates to the composition or construction of the insert itself.

In Figs. 1 and 2 spring leaves 10 have liners 12 extending lengthwise thereof. Each liner 12 has a narrow strip 14 secured thereto and received within a groove 16 formed in the overlying spring leaf. In Figs. 4 and 5 liners 18 are held by a stepped strap 20 supported by a clamp 22 which is secured to the spring leaf assembly, as shown in the application of Charles G. Davis, Serial No. 239,977, filed August 2, 1951. The liners extend lengthwise between the ends of successive spring leaves 10. No claim is made in this application to this means of supporting the liner.

Inserts or liners suitable for use as between spring leaves have heretofore been provided. Such liners have been composed of many different materials, such as felted or woven fabric, paper, rubber compounds, plastic, metallic compositions, and combinations of these various things. Woven fabric impregnated with various types of lubricant, such as greases, oil, or the like, have been widely used because it was recognized as desirable to have liners which applied a lubricant to the spring leaves. One disadvantage of lubricant impregnated fabric is that its lubricating characteristic is present only in the surface lubricant and the surface loses its lubricating characteristic with use except as lubricant may be squeezed to the surface, but that is a different response from the migration or blooming herein described.

This particular liner is a composition formed primarily of rubber. Smoked sheets of natural rubber may be used. Synthetic rubber compounds may be used instead of the natural rubber. Neoprene, Buna N or Buna S, would be satisfactory synthetics. The rubber compound I propose to use as a base in producing my improved liner may be prepared in part according to conventional rubber procedures. Such rubber compounds contain percentages of accelerator, activator, antioxidant, etc. Rubber compounds as presently prepared commonly contain relatively small amounts of stearic acid as an activator. Stearic acid in amounts of ½% to 3% of the rubber content is commonly used.

I have found that if a rubber compound of the above general character is provided with stearic acid in approximately twice the maximum amount above mentioned for use as an activator, for example in amounts of 5% to 10% of the rubber content rather than in amounts of ½% to 3% thereof that the stearic acid will not only serve its purpose as an activator but will "bloom" or migrate to the surface of the rubber providing thereon a waxy bloom opposed to the surface of the spring leaves and that this blooming will continue throughout a long period of time. This waxy bloom provides an efficient lubricant for the spring leaves. The stearic acid which migrates to the surface not only constitutes a very satisfactory lubricant for the spring leaves but inasmuch as such migration continues throughout a substantial period of time the stearic acid serves such lubricating purpose throughout a long period of use of the liner.

Other lubricating ingredients may be used along with the stearic acid and will migrate therewith to the surface of the rubber compound and will function therewith as lubricants on such surface. For example, paraffin wax and castor oil may be used along with the stearic acid. One formula which has been found satisfactory is:

|  | Parts |
|---|---|
| Natural rubber (smoked sheets) | 100 |
| Carbon black (standard rubber compound ingredient) | 45 |
| Sulphur (standard rubber compound ingredient) | 3 |
| Zinc oxide (standard rubber compound ingredient) | 3 |
| Pine tar (standard rubber compound ingredient) | 1 |
| Accelerator (tetramethylthiouramdisulphide) | 1 |
| Antioxidant (such as Agerite, phenyl-beta-naphthyl amine, one conventional ingredient) | 1 |
| Stearic acid | 5 |
| Castor oil | 5 |
| Paraffin wax | 5 |

Examples of synthetic rubber compounds which have been found suitable are as follows:

| Neoprene Compound | lbs. | oz. |
|---|---|---|
| Neoprene "W" (synthetic rubber of the chloroprene variety) | 100 |  |
| Neozone "A" (beta-alpha-naphthylamine) (std. accelerator) | 2 |  |
| L. C. MgO (curing agent) | 3 |  |
| Statex "M" (fine extrusion furnace carbon black) | 43 |  |
| Permalux (di-ortho-tolylguanidine salt of dicatechol borate) |  | 8 |
| Zinc Oxide (Activator) | 5 |  |
| Stearic Acid | 5 |  |
| Paraffin Wax | 5 |  |
| Castor Oil | 5 |  |
|  | 168 | 8 |

| Buna S Compound | lbs. | oz. |
|---|---|---|
| GRS (Buna S; synthetic rubber, butadiene styrene type) | 100 |  |
| Zinc Oxide Activator | 5 |  |
| Sulphur (curing agent) | 2 |  |
| Altax (accelerator benzothiazyl disulfide) | 1 | 8 |
| Diphenyl-guanidine (accelerator) |  | 4 |
| Statex "B" (fine furnace carbon black) | 100 |  |
| Cumar P-25 (Plasticizer; coumarone-indene resin) | 5 |  |
| Stearic Acid (Activator) | 5 |  |
| Paraffin Wax | 5 |  |
| Castor Oil | 5 |  |
|  | 228 | 12 |

| Buna N Compound | lbs. | oz. |
|---|---|---|
| Hycar EP-25 (Buna N; synthetic rubber, butadiene-acrylonitrile) | 100 |  |
| Zinc Oxide (Activator) | 5 |  |
| Altax (Accelerator; benzothiazyl disulfide) | 1 | 8 |
| Sulphur (curing agent) | 1 | 8 |
| Dibutyl phthalate (plasticizer) | 10 |  |
| Cumar P-25 (plasticizer; coumarone-indene resin) | 10 |  |
| Statex B (fine furnace carbon black) | 43 |  |
| Stearic Acid (activator) | 1 |  |
| Paraffin Wax | 5 |  |
| Castor Oil | 5 |  |
|  | 182 |  |

Stearic acid is already in use in rubber compounds as an activator but in substantially smaller percentages than above set forth, such as ½% to 3% depending upon the compound, and in such percentages as not to bloom. "Blooming" is an undesirable characteristic generally on rubber compounds in that it discolors the surface of the rubber. Paraffin wax and castor oil are also now used in certain rubber compounds as softeners or processing aids. Such ingredients are however used only in small amounts as for example 1% of the rubber content. I propose to use them in substantially greater amounts as set forth. Such compound is vulcanized and provided in suitable lengths for the purpose intended.

In order that the liners will not bloom along the edges which are exposed between the spring leaves, which bloom would discolor such edges so that they would exhibit an unattractive appearance and which blooming would also cause such edges, because of the waxy surface presented, to collect dust, dirt and the like and retain the same, such edges may be provided with a protective coating of lacquer or an edge binding of thin metal or fabric strip adhered thereto.

What I claim is:

1. A spring liner consisting of a vulcanized rubber compound comprising:

|  | Parts |
|---|---|
| Natural rubber (smoked sheets) | 100 |
| Carbon black | 45 |
| Sulphur | 3 |
| Zinc oxide | 1 |
| Pine tar | 1 |
| Accelerator (tetramethylthiouramdisulphide) | 1 |
| Antioxidant; phenyl-beta-naphthylamine | 1 |
| Stearic acid | 5 |
| Castor oil | 5 |
| Paraffin wax | 5 |

2. A spring liner consisting of a synthetic rubber compound comprising:

| Synthetic chloroprene rubber | pounds | 100 |
|---|---|---|
| Standard Accelerator: beta-alpha-naphthylamine | pounds | 2 |
| MgO (curing agent) | do | 3 |
| Fine Extrusion Furnace Carbon Black | do | 43 |
| Di-ortho-tolylguanidine salt of dicatichol borate | ounces | 8 |
| Zinc oxide (activator) | pounds | 5 |
| Stearic acid | do | 5 |
| Paraffin wax | do | 5 |
| Castor oil | do | 5 |

3. A spring liner consisting of a synthetic rubber compound comprising:

| Butadiene styrene synthetic rubber | 100 lbs. |
|---|---|
| Zinc oxide (activator) | 5 lbs. |
| Sulphur (curing agent) | 2 lbs. |
| Accelerator; benzothiazyl disulfide | 1 lb., 8 ozs. |
| Diphenyl-guanidine (accelerator) | 4 ozs. |
| Fine furnace carbon black | 100 lbs. |
| Plasticizer coumarone-indene resin | 5 lbs. |
| Stearic acid (activator) | 5 lbs. |
| Paraffin wax | 5 lbs. |
| Castor oil | 5 lbs. |

4. A spring liner consisting of a synthetic rubber compound comprising:

| Synthetic rubber, butadiene-acrylonitrile | 100 lbs. |
|---|---|
| Zinc oxide (activator) | 5 lbs. |
| Accelerator benzothiazyl-disulfide | 1 lb., 8 ozs. |
| Sulphur (curing agent) | 1 lb., 8 ozs. |
| Dibutyl phthalate (plasticizer) | 10 lbs. |
| Plasticizer; coumarone-indene resin | 10 lbs. |
| Fine furnace carbon black | 43 lbs. |
| Stearic acid (activator) | 1 lb. |
| Paraffin wax | 5 lbs. |
| Castor oil | 5 lbs. |

(References on following page)

References Cited in the file of this patent

UNITED STATES PATENTS

| | | |
|---|---|---|
| 1,889,165 | Walker | Nov. 29, 1932 |
| 2,026,442 | Somerville | Dec. 31, 1935 |
| 2,107,455 | Thompson | Feb. 8, 1938 |
| 2,156,530 | Freeman | May 2, 1939 |
| 2,186,793 | Wodtke | Jan. 9, 1940 |
| 2,278,982 | Frolich | Apr. 7, 1942 |
| 2,290,670 | Bull | July 21, 1942 |
| 2,302,003 | Cadwell et al. | Nov. 16, 1942 |
| 2,317,291 | McIntyre | Apr. 20, 1943 |
| 2,330,563 | Duval | Sept. 28, 1943 |
| 2,348,942 | Watson | May 16, 1944 |
| 2,368,522 | Cornell et al. | Jan. 30, 1945 |
| 2,450,101 | Veneklasen et al. | Sept. 28, 1948 |
| 2,455,855 | Murphy et al. | Dec. 7, 1948 |
| 2,473,319 | Winkebman | June 14, 1949 |
| 2,477,336 | Jennings | July 26, 1949 |